United States Patent [19]

Brown

[11] 4,356,911
[45] Nov. 2, 1982

[54] LINEAR DRIVE UNIT FOR VIBRATORY CONVEYOR

[75] Inventor: William R. Brown, Blairsville, Pa.

[73] Assignee: FMC Corporation, Chicago, Ill.

[21] Appl. No.: 170,248

[22] Filed: Jul. 18, 1980

[51] Int. Cl.³ .................. B65G 27/08; B65G 27/24
[52] U.S. Cl. ............................... 198/766; 198/769
[58] Field of Search ....................... 198/752–755, 198/758–770; 209/366 P, 368

[56] References Cited

FOREIGN PATENT DOCUMENTS 559343  8/1957  Belgium .......................... 198/769
125646  2/1900  Fed. Rep. of Germany ...... 198/763
1456539 10/1969 Fed. Rep. of Germany ...... 198/768

Primary Examiner—Robert B. Reeves
Assistant Examiner—Douglas D. Watts

[57] ABSTRACT

A vibratory conveyor has a continuous trough that extends over one or more linear drive units. Each drive unit has an elongated base that extends longitudinally of the conveyor. The base is resiliently mounted to a fixed support. A trough support is disposed parallel to the base. A driver is arranged to move the trough support longitudinally of the conveyor and relative to the base. A plurality of leaf springs extend in an at rest position generally perpendicular to the direction of linear drive, longitudinally of the conveyor. These leaf springs interconnect the base and the trough support at longitudinally spaced locations. The base and the trough support are disposed laterally of each other in a horizontal plane. Preferably, the leaf springs are mounted for pivotal movement about axes extending laterally of the conveyor between the base and the trough support. Such movement adjusts the transverse angle of inclination between one side of the leaf spring and a vertical line. This adjustment can be made without changing the direction in which the leaf springs extend in an at rest position between the base and the trough support, and the adjustment provides a desired vibration angle for the trough. The angular difference between the transverse angles of inclination at the sides of the various leaf springs provides for rotational motion of the trough support relative to the base. This motion compensates for rotational motion of the drive unit on its fixed support due to inertia forces.

9 Claims, 6 Drawing Figures

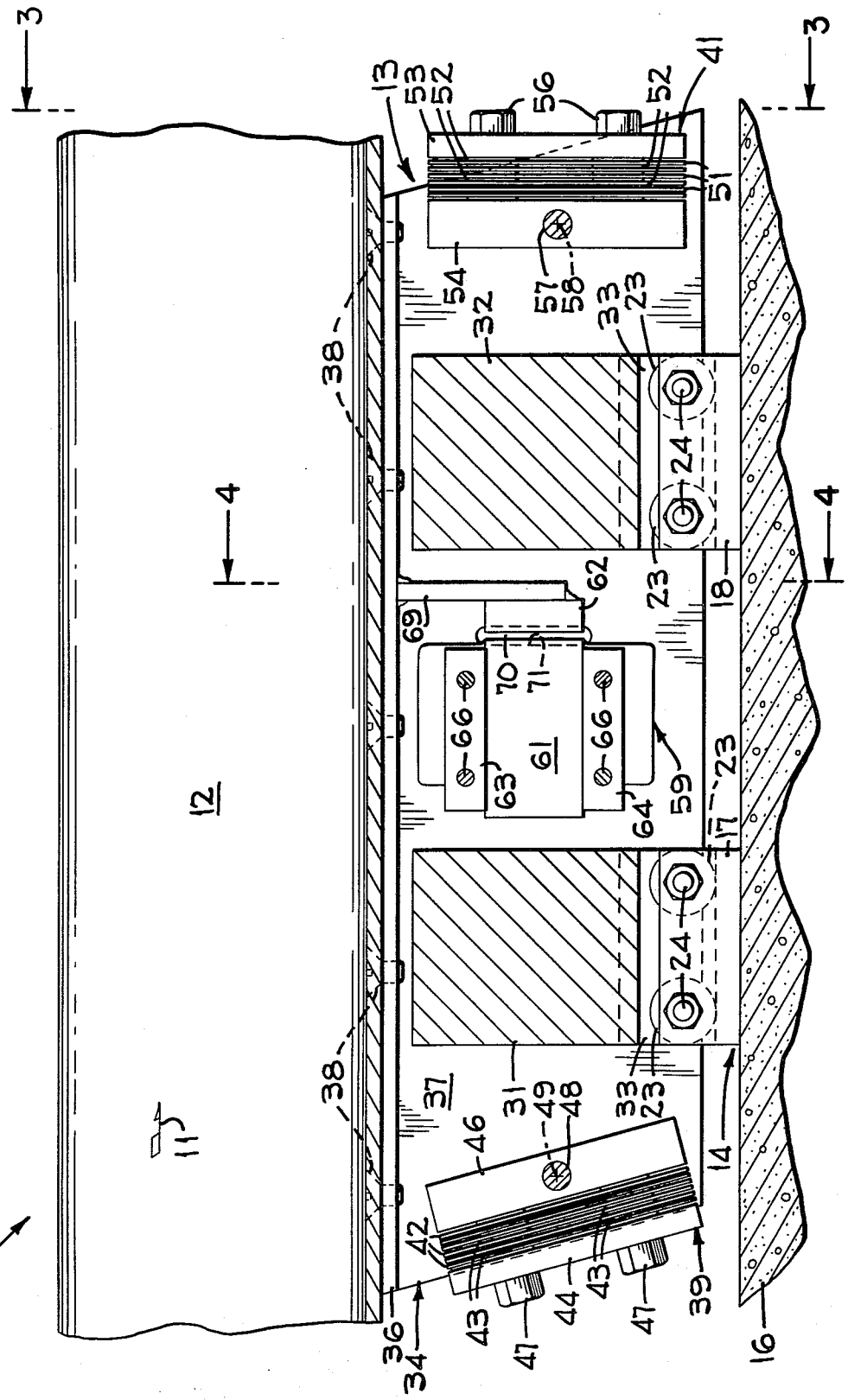
FIG_1

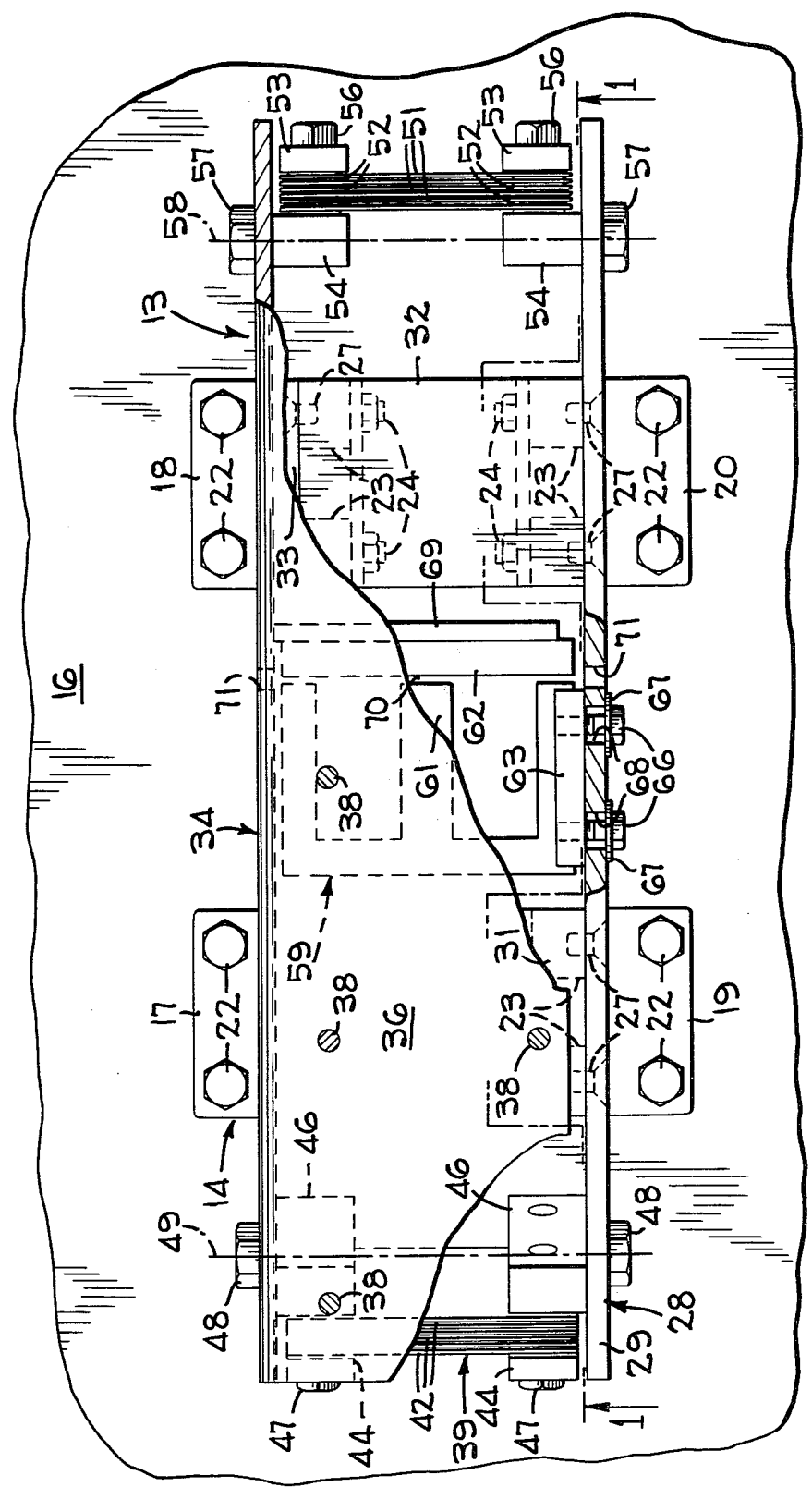
FIG_2

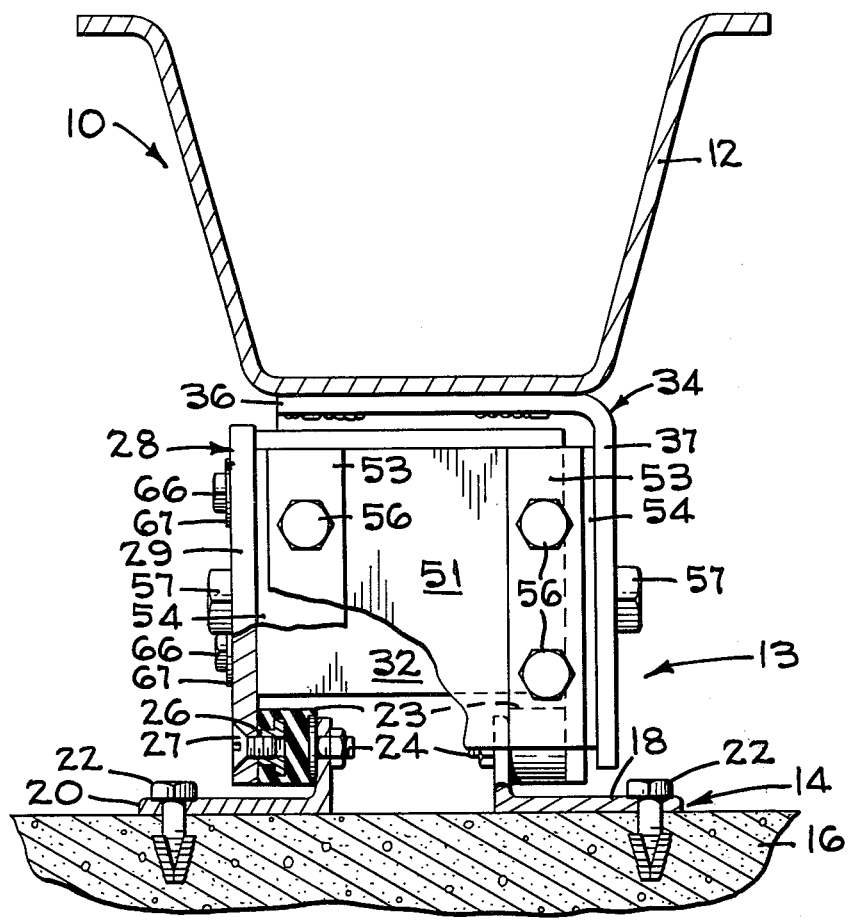
FIG_3
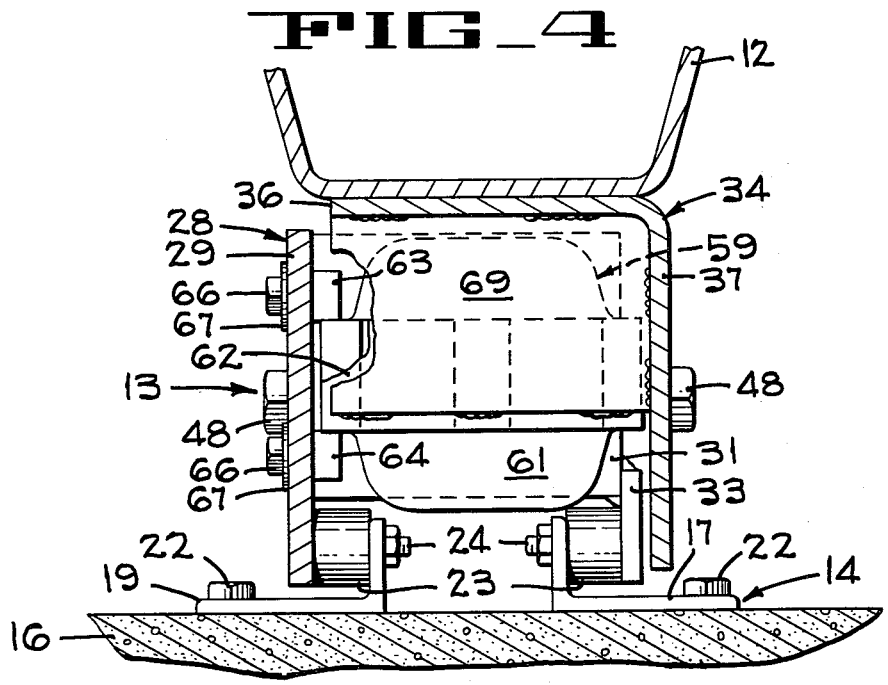
FIG_4

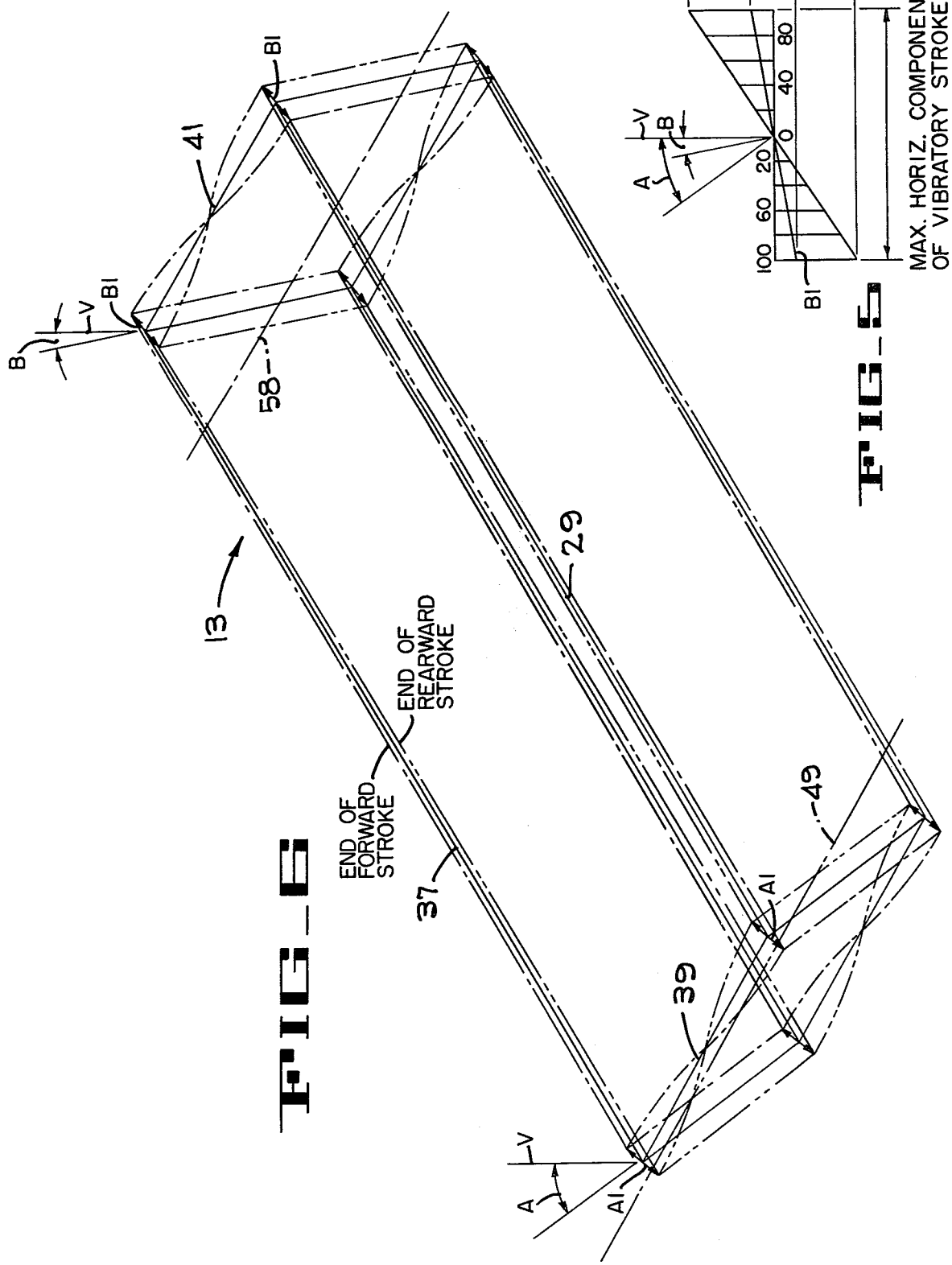

LINEAR DRIVE UNIT FOR VIBRATORY CONVEYOR

BACKGROUND OF THE INVENTION

1. Field of the Invention

This invention relates to a vibratory conveyor having a linear drive unit that includes a base and a trough support interconnected by a plurality of leaf springs.

2. Description of the Prior Art

Vibratory conveyors have base and trough assemblies that are interconnected by leaf springs to provide for vibratory movement. Both assemblies have masses that, upon vibratory movement, create inertia forces acting at the centers of mass of each assembly. These inertia forces form a force couple that tends to rotate or rock the whole conveyor longitudinally on its mounting. To compensate for such rotational motion, leaf springs have been arranged in non-parallel relationship within the vertical planes of their vibration paths. Such leaf spring arrangements are disclosed by U.S. Pat. No. 3,216,556 that issued Nov. 9, 1965, to W. C. Burgess, Jr. and by my co-pending U.S. application, Ser. No. 912,806, that was filed June 5, 1978 now issued as U.S. Pat. No. 4,260,052.

These leaf spring angles of inclination have also been adjusted to provide desired vibration angles for the trough assembly. Maximum feed rates can be achieved for various granular materials by making such adjustments. A driver for generating vibrational forces should be mounted perpendicular to the leaf springs, or tangential to their arcuate paths of vibrational travel, for efficient utilization of the vibratory forces developed. Otherwise, the leaf springs do not bend readily, and such springs transfer axial forces that are resistive to desired movement between the base and trough assemblies.

SUMMARY OF THE INVENTION

A vibratory conveyor that can be mounted to a fixed support is provided with a linear drive unit having an elongated base and a trough support disposed laterally parallel of each other in a horizontal plane. A driver is arranged to move the trough support longitudinally of the conveyor and relative to the base. A plurality of leaf springs interconnect the base and the trough support at longitudinally spaced locations. These leaf springs, in an at rest position, extend transversely of the conveyor between the base and the trough support in a direction generally perpendicular to the direction of linear drive, longitudinally of the conveyor. The leaf springs are adjustable to provide a desired vibration angle for a trough support and to compensate for rotational motion of the drive unit due to inertia forces. Regardless of these adjustments, the leaf springs are aligned generally perpendicular to the direction of force developed by the driver for moving the trough support.

In a preferred form of the invention, the leaf springs are mounted for pivotal movement about axes extending laterally of the conveyor between the base and the trough support to adjust the transverse angle of inclination between one side of each leaf spring and a vertical line. Such adjustment provides for a desired vibration angle of the trough. The angular difference between the transverse angles of inclination at the sides of the various leaf springs provides for rotational motion of the trough support relative to the base. This motion compensates for rotational motion of the drive unit on its fixed support due to inertia forces.

BRIEF DESCRIPTION OF THE DRAWINGS

FIG. 1 is a longitudinal section taken on the line 1—1 of FIG. 2 showing a vibratory conveyor with a linear drive unit embodying the present invention.

FIG. 2 is a plan view of the drive unit shown in FIG. 1, with parts broken away to show underlying structure.

FIG. 3 is a transverse section taken along line 3—3 of FIG. 1 with portions being broken away.

FIG. 4 is a broken transverse section taken along line 4—4 of FIG. 1 with portions being broken away.

FIG. 5 is a graphical illustration of inclined strokes A1 and B1, having vertical components A2 and B2 at a maximum horizontal component for the vibratory stroke.

FIG. 6 is a schematic diagram illustrating the mechanical motion of the drive unit shown in FIG. 1.

DESCRIPTION OF THE PREFERRED EMBODIMENT

Looking now at FIG. 1, there is shown a vibratory conveyor 10 for advancing material longitudinally thereof in the direction of arrow 11. This conveyor has a continuous trough 12 that extends over one or more linear drive units 13. Each drive unit is attached to a fixed support 14 of the conveyor.

The fixed support 14 has a concrete foundation 16 upon which angles 17, 18, 19 and 20 are mounted, as shown in FIG. 2. Each angle has horizontal leg that is attached to the foundation by anchor screws 22 and a vertical leg to which vibration isolators 23 are connected by stud bolts 24. The vibration isolators have a generally cylindrical shape and are made of an elastomeric material, such as rubber, that deflects under loading. The stud bolts that are embedded within one end of the vibration isolators project axially outward therefrom. Within the opposite ends of the vibration isolators are embedded internally threaded sleeves 26, shown in FIG. 3, coaxial with the isolators. These sleeves receive cap screws 27 for attaching the drive unit 13 to the isolators.

The drive unit 13 has an elongated base 28, as shown in FIG. 2, that includes a vertical plate 29 at one side of the drive unit. This plate extends longitudinally of the drive unit. Weight blocks 31 and 32 are welded to the plate and project laterally therefrom. The purpose of the weight blocks is to increase the mass of the base and to raise the center of mass of the base. At the distal ends of these weight blocks, there are welded depending strips 33 (FIG. 4) that are fastened by cap screws 27 to vibration isolators 23 mounted on the angles 17 and 18. Thus, the base 28 is resiliently mounted by vibration isolators to the fixed support 14.

A trough support 34 is disposed parallel to the base 28. This support is formed by an angle bracket having horizontal flange 36 and a vertically depending flange 37. The trough 12 is fastened to the horizontal flange of the trough supported by flat-headed screws 38, (FIGS. 1 and 2) which are countersunk within the bottom of the trough. Alternately, the trough could be fastened by means of welding to the horizontal flange. The vertically depending flange 37 is parallel to the vertical plate 29. This flange is supported in spaced relationship from the plate by leaf springs 39 and 41 at locations that are spaced longitudinally of both the base and the trough support.

The leaf spring 39 is located at the upstream end of the drive unit 13. This spring includes a set of leaves 42 that are separated by spacers 43. At both sides of the drive unit, the end portions of the leaves are held in place between clamps 44 and mounting blocks 46 by cap screws 47 that extend transversely therebetween. Each mounting block is held in place by a cap screw 48 that extends through either the vertical plate 29 or the vertically depending flange 37 into the adjacent mounting block 46. Both cap screws 48 are aligned on a common axis 49 extending laterally between the plate and the flange, thereby mounting the leaf spring 39 for pivotal movement about the common axis.

The leaf spring 41 is located at the downstream end of the drive unit 13. This leaf spring includes a set of leaves 51 that are separated by spacers 52. At both sides of the drive unit, the end portions of the leaves are held in place between clamps 53 and mounting blocks 54 by transversely extending cap screws 56. Each mounting block is held in place by a cap screw 57 that extends through either the vertical plate 29 or the vertically depending flange 37 into the adjacent mounting block. Both cap screws 57 are aligned on a common axis 58 extending laterally between the plate and the flange, thereby mounting the leaf spring 41 for pivotal movement about the common axis 58.

A driver 59 is arranged to move the trough support 34 longitudinally relative to the base 28. The driver has a core assembly 61 and an armature 62. The core assembly has an upper mounting plate 63 and a lower mounting plate 64 that are located on the side of the core assembly adjacent the vertical plate 29. Cap screws 66 fit through washers 67, slotted openings 68 in the vertical plate, and into the upper and lower mounting plates to fasten the core assembly to the vertical plate. The armature is welded to a vertical plate 69 that is welded to the horizontal flange 36 of the trough support 34. A gap 70 between the armature and the core assembly can be adjusted by loosening the cap screws 66 as to slide within the slotted openings 68 and by moving the core assembly longitudinally of the drive unit 13. An opening 71 is provided in the vertically depending flange 37 for viewing or measuring the gap.

Before commencing operation, each drive unit 13 is adjusted to provide a desired gap 70 between the core assembly 61 and the armature 62. This gap is a factor in determining the horizontal component of the vibratory stroke at the ends of each leaf spring 39 and 41. With reference to FIG. 5, the horizontal line represents the maximum horizontal component of the vibratory stroke. This line has been divided into proportional parts representing percentages of the maximum, with 0 or the at rest position, being located at the midpoint of the line.

The vertical component of the vibratory stroke at the ends of each leaf spring 39 or 41 depends upon the transverse angle of inclination between one side of that leaf spring and a vertical line. Each leaf spring is adjusted to a desired transverse angle of inclination by loosening the cap screws 48 or 57, pivoting the spring about the axis 49 or 58, and then tightening the cap screws to lock the spring at the desired angle. With reference to FIGS. 5 and 6, leaf spring 39 is set at a transverse angle of inclination A, while leaf spring 41 is set at a transverse angle of inclination B. Under these conditions, the vibratory stroke at the ends of leaf spring 39 is represented by the line A1, while the line A2 represents the vertical component of this vibratory stroke. The ends of leaf spring 41 have a vibratory stroke indicated by the lines B1, while B2 represents the vertical component of this vibratory stroke.

With reference to FIG. 6, the solid lines represent the outline of the vertical plate 29, vertical depending flange 37, and leaf springs 39 and 41 in an at rest position. The single small dash lines represent these components at the end of a forward stroke, while the double small dash lines represent the same components at the end of a rearward stroke. The leaf springs flex so that the ends thereof swing along arcuate lines A1 and B1 representing the vibratory stroke. These lines are generally perpendicular to one side of the associated leaf spring. Since the transverse angle of inclination A is greater than the transverse angle of inclination B, the vertical component A2 is greater than the vertical component B2. This causes rotational motion in a vertical plane for the vertical depending flange 37 of the trough support 34. Such rotational motion can compensate for rocking or rotational motion of the whole vibratory conveyor 10 due to inertia forces. The average transverse angle of inclination determines the vibration angle for the trough assembly.

From the foregoing description, it will be seen that the vibratory conveyor 10 has an elongated base 28 and a trough support 34 that are disposed laterally parallel of each other in a horizontal plane and that extend longitudinally of the conveyor. A plurality of leaf springs 39 and 41 interconnect the base and the trough support at locations spaced longitudinally thereof. These leaf springs extend in an at rest position generally perpendicular to a direction longitudinally of the conveyor in which a driver moves the trough support relative to the base. The leaf springs can be adjusted to provide a desired vibration angle for the trough support and to compensate for rotational motion of the drive unit 13 due to inertia forces, and regardless of these adjustments, the leaf springs maintain their at rest positioning of generally perpendicular to a direction longitudinally of the conveyor.

Although the best mode contemplated for carrying out the present invention has been herein shown and described, it will be apparent that modification and variation may be made without departing from what is regarded to be the subject matter of the invention.

What is claimed is:

1. In a linear drive unit for a vibratory conveyor that can be mounted to a fixed support, said drive unit comprising an elongated base that extends longitudinally of the conveyor for resiliently mounting to the fixed support, a trough support disposed parallel to the base, a plurality of leaf springs interconnecting the base and the trough support at location spaced longitudinally thereof, and a driver arranged to move the trough support longitudinally of the conveyor and relative to the base, the improvement comprising said base and said trough support being disposed laterally of each other in a horizontal plane, said leaf spring in an at rest position extending transversely between the base and the trough support in a direction generally perpendicular to the direction of linear drive longitudinally of the conveyor, means for adjusting the leaf springs to vary the vertical movement of the trough support without changing the direction in which the leaf springs extend in an at rest position between the base and the trough support.

2. The improved linear drive unit described in claim 1 wherein each leaf spring is mounted for pivotal movement about an axis that extends laterally between the base and the trough support to adjust the transverse angle of inclination between one side of the leaf spring and a vertical line.

3. The improved linear drive unit described in claim 1 wherein said plurality of leaf springs are adjusted so that the transverse angle of inclination of one leaf spring is greater than the transverse angle of inclination of the other leaf spring for guiding the trough support in a path of rotational motion relative to the base within a vertical plane that extends longitudinally of the conveyor; said trough support rotation occurring in a direction opposite to the rotational motion of the whole drive unit on its fixed support due to inertia forces.

4. The improved linear drive unit described in claim 2 including said base having a plate projecting vertically at one side of the drive unit, said trough support being in the form of bracket having a vertically depending flange on the opposite side of the drive unit from the vertical plate of the base, a pair of mounting blocks connected to opposite ends of each leaf spring, first cap screws extending through the base plate to mounting blocks at one end of the leaf springs and second cap screws extending through the depending flange to mounting blocks at the other end of the leaf springs.

5. A linear drive unit for a vibratory conveyor that can be mounted to a fixed support, said drive unit comprising an elongated base that extends longitudinally of the conveyor for resiliently mounting to the fixed support, a trough support disposed parallel to the base, a driver arranged to move the trough support longitudinally of the conveyor and relative to the base, and a plurality of leaf springs that extend in an at rest position generally perpendicular to the direction of linear drive longitudinally of the conveyor, said leaf springs interconnecting the base and the trough support at locations spaced longitudinally thereof, said base and said trough support being disposed laterally of each other in a horizontal plane, means for adjusting the leaf springs to vary the vertical movement of the trough support without changing the direction in which the leaf springs extend in an at rest position between the base and the trough support.

6. The linear drive unit described in claim 5 wherein each leaf spring is mounted for pivotal movement about an axis that extends laterally between the base and the trough support to adjust the transverse angle of inclination between one side of the leaf spring and a vertical line.

7. The linear drive unit described in claim 6 wherein said plurality of leaf springs are positioned with the transverse angle of inclination of one leaf spring being greater than the transverse angle of inclination of the other leaf spring whereby the leaf springs guide the trough support in a path of rotational motion relative to the base within a vertical plane that extends longitudinally of the conveyor, said trough support rotation occurring in a direction opposite to the rotational motion of the whole drive unit on its fixed support due to inertia forces.

8. The linear drive unit described in claim 7 wherein each leaf spring side is adjusted to a desired transverse angle of inclination with respect to a vertical line to provide a desired vibration angle for the trough support and thereby achieve the maximum feed rate for a given type of granular material.

9. The linear drive unit described in claim 5 including said base having a plate projecting vertically at one side of the drive unit, said trough support being in the form of bracket having a vertically depending flange on the opposite side of the drive unit from the vertical plate of the base, a pair of mounting blocks connected to opposite ends of each leaf spring, first cap screws extending through the base plate to mounting blocks at one end of the leaf springs and second cap screws extending through the depending flange to mounting blocks at the other end of the leaf springs.

* * * * *